United States Patent [19]
Pawlowski et al.

[11] Patent Number: 5,682,551
[45] Date of Patent: Oct. 28, 1997

[54] SYSTEM FOR CHECKING THE ACCEPTANCE OF I/O REQUEST TO AN INTERFACE USING SOFTWARE VISIBLE INSTRUCTION WHICH PROVIDES A STATUS SIGNAL AND PERFORMS OPERATIONS IN RESPONSE THERETO

[75] Inventors: Chester Walenty Pawlowski, Westford; Nicholas Allen Warchol, Boxborough; David Gerard Conroy, Maynard, all of Mass.; R. Stephen Polzin, Morgan Hill, Calif.

[73] Assignee: Digital Equipment Corporation

[21] Appl. No.: 25,304

[22] Filed: Mar. 2, 1993

[51] Int. Cl.⁶ .................................................. G06F 13/20
[52] U.S. Cl. ........................ 395/856; 395/824; 395/306; 395/404; 395/438; 395/842
[58] Field of Search .................................. 395/200, 250, 395/275, 325, 800, 842, 306, 404, 438, 824, 856; 364/238.3, 240.5

[56] References Cited

U.S. PATENT DOCUMENTS

| | | | |
|---|---|---|---|
| 4,665,482 | 5/1987 | Murray et al. | 364/200 |
| 4,901,232 | 2/1990 | Harrington et al. | 364/200 |
| 5,003,463 | 3/1991 | Coyle et al. | 364/200 |
| 5,016,160 | 5/1991 | Lambeth et al. | 364/200 |
| 5,031,091 | 7/1991 | Wakatsuki et al. | 364/200 |
| 5,038,275 | 8/1991 | Dujari | 364/200 |
| 5,131,081 | 7/1992 | MacKenna et al. | 395/275 |
| 5,142,689 | 8/1992 | Eisenack | 395/800 |
| 5,295,246 | 3/1994 | Bischoff et al. | 395/250 |
| 5,359,715 | 10/1994 | Heil et al. | 395/325 |

OTHER PUBLICATIONS

Willard "Futurebus+, An Architecture for I/O Devices," DECUS, Dec. 1991.

*Primary Examiner*—Thomas C. Lee
*Assistant Examiner*—Anderson I. Chen
*Attorney, Agent, or Firm*—Joanne N. Pappas; Gary E. Ross; Arthur W. Fisher

[57] ABSTRACT

An apparatus including a system bus coupled to an I/O interface which includes a pointer register and a rejecting circuit which determines whether a write to the pointer register will be accepted or rejected. The I/O interface is further coupled to at least one I/O bus having at least one I/O device connected thereto. The system bus is further coupled to a main memory and to a Central Processing Unit (CPU) which is capable of executing software instructions, providing a command structure corresponding to an access of an I/O device, and writing to the pointer register an address of a location in main memory of the command structure. The CPU further includes a hardware indicator responsive to the rejecting circuit for providing a status signal indicating the status of a write to the pointer register. The CPU executes the software in accordance with the status signal. The apparatus allows the software being executed by the CPU to software pend accesses to devices not directly connected to the system bus. This improves system performance over non-pended system buses and reduces the amount of hardware needed as compared to pended system buses.

30 Claims, 6 Drawing Sheets

SYSTEM FOR CHECKING THE ACCEPTANCE OF I/O REQUEST TO AN INTERFACE USING SOFTWARE VISIBLE INSTRUCTION WHICH PROVIDES A STATUS SIGNAL AND PERFORMS OPERATIONS IN RESPONSE THERETO

BACKGROUND OF THE INVENTION

This invention relates generally to computer systems, and more particularly to the access of devices indirectly connected to a system bus of a computer system through an I/O interface.

As it is known in the art, computer systems generally include at least one central processing unit (CPU) module, a main memory for storing data, at least one input/output (I/O) interface, and a system bus coupling the aforementioned devices to the CPU module. The CPU module, hereinafter referred to as the CPU, may include a plurality of processor integrated circuit components, hereinafter referred to as processors. The I/O interface generally has at least one port which is coupled to an I/O bus which provides for access to one or more devices coupled to the I/O bus. Many different types of devices may be resident on the I/O bus, such as mass storage devices, i.e., disk drives, tape drives, etc., printers, terminals, or adapter devices, i.e., devices which couple the I/O bus to other remote buses including other system buses within other computer systems and other I/O buses, and so forth. References hereinafter to I/O devices include any devices resident on remote system buses.

Generally, I/O interfaces are used to transfer data between the system bus and the I/O bus thus coupling devices on the I/O bus to the remainder of the computer system. A CPU on the system bus may directly transfer data with an I/O device through the I/O interface, or a CPU may prepare an I/O device for a direct memory access (DMA) through the I/O interface. A DMA transfer occurs when the I/O device directly transfers data with the main memory without the intervening control of a CPU.

At reset or power-up time, a CPU on the system bus reads registers on each I/O device to determine the capabilities of the I/O devices. The CPU then writes to other registers on the I/O devices to enable the I/O devices to operate on the I/O bus in accordance with the capabilities of each I/O device. Often the CPU will also load a specific register on each I/O device with an address of a set of locations in main memory which are designated for DMA use by that particular I/O device, i.e., the I/O device should read from or write to those locations in main memory when executing a DMA.

During normal operation in a system which implements DMA transfers, a CPU transfers data to an I/O device, by placing the data in main memory at the locations from which the I/O device has been prepared to read from. The CPU then writes directly to one or more predetermined I/O device control and status registers (CSRs) via the I/O interface to initiate the DMA read. Following this preparation, the I/O device will directly read the data from main memory via the I/O interface. When a CPU retrieves data from an I/O device, the CPU writes to one or more predetermined I/O device CSRs to initiate the DMA write. The I/O device then directly writes the data to the locations in main memory which the I/O device has been designated to write to. The CPU may then read the data.

A problem is encountered when a CPU accesses devices either coupled to the I/O bus directly connected to the I/O interface (a local I/O bus) or coupled to a remote bus. Since the clock cycle time of a CPU may be as short as five nanoseconds whereas the access time required to read from or write to an I/O device may be many times longer than the clock cycle time of the CPU, the time required to directly transfer data with an I/O device (instead of a DMA) or preparing an I/O device to execute a DMA by writing Go CSRs may be very significant. For example, it may take ten microseconds or more to read from or write to a CSR on an I/O device. This corresponds to two thousand CPU clock cycles (assuming a five nanosecond clock cycle).

To compensate for this, one technique used is to stall the CPU. That is, when the CPU is directly accessing an I/O device (whether to transfer a large amount of data or access a CSR), the CPU and, hence, the system bus stalls until the read from the I/O device or the write to the I/O device completes. A stall occurs where the CPU controls the system bus until the I/O device access is complete. One problem with this approach is that in computer systems which employ multiple CPUs or which permit I/O devices to execute DMA transfers, system bus cycles are wasted during a stall because no other device may use the system bus until the I/O device access is complete. The CPU currently stalling the bus also can not continue processing until the I/O device access is complete. Time is required for the I/O interface to arbitrate for the I/O bus (more time is required if the I/O interface does not immediately gain control of the I/O bus, i.e., other devices with higher arbitration priority than the I/O interface are requesting control of the bus or there is a current transaction that must complete) and considerably more time may be required if the I/O device to be accessed is resident on a remote bus which requires an adapter device to arbitrate for control of the remote bus. Additional time is generally required to actually complete the access once the connection with the I/O device is established. Accordingly, the performance of the computer system is degraded as system bus cycles are wasted while waiting for the I/O device access to complete.

One technique used to partially compensate for the aforementioned stall problem is to provide a stalling system bus which allows a CPU to initiate a write operation and then relinquish control of the system bus prior to the write operation being completed. This allows other devices to quickly gain control of the system bus following the write to an I/O device. This technique is often referred to as a "dump-and-run" write. The CPU may initiate a write to an I/O device and then relinquish control of the system bus prior to the write being completed on the assumption that the I/O interface will complete the write.

One problem with this technique is that while it allows other devices to gain control of the system bus more quickly than if the system bus and CPU were stalled waiting for the write to complete, if another CPU tries to write to an I/O device, this request may not be accepted by the I/O interface. While the problem could be alleviated by providing an I/O interface which accepts more than one I/O device write, there is usually a limit to this number, and where this limit is less than the number of possible outstanding I/O device writes, a request may not be accepted by the I/O interface. This dump-and-run technique also does not address the long latencies associated with I/O device read transactions.

Moreover, a "deadlock" can occur in computer systems in which a CPU and the system bus stall while waiting for an I/O device access to complete. A deadlock occurs where a CPU has control of the system bus and is stalled waiting for an I/O device access to complete, while an I/O device has control of the I/O bus and is stalled waiting for an access with main memory to complete. Neither transaction can complete, and, thus, both buses hang indefinitely.

In order to detect a deadlock, timeout hardware is implemented which establishes a maximum time limit for a transaction to complete before "timing out". Timeout hardware generally includes an oscillator, a counter, and interrupt hardware to respond to the timeout. When a timeout occurs signifying a deadlock, generally, the bus interfaces of all the devices resident on each bus are reset. Following reset, the transactions are retried or the previously detected deadlock is flagged as an error. The recovery mechanisms for a deadlock may be extensive in computer systems where deadlocks could happen regularly in order to efficiently and properly recover from a deadlock. Moreover, deadlocks degrade system performance by wasting system bus cycles when a deadlock occurs and also, following the detection of a deadlock when the bus interfaces are reset.

Alternatively, rather than detect a deadlock, a system may be designed to avoid deadlocks. This can be done through a retry mechanism on the system bus or the I/O bus or both. Where a retry mechanism is provided on the system bus, if the I/O interface receives a request from a system bus device for access to an I/O device and a request from an I/O device for access to a system bus device, the I/O interface may avoid a deadlock by causing the system bus device to retry its request through the retry mechanism provided on the system bus. Where a retry mechanism is provided on the I/O bus, the I/O interface may avoid a deadlock by causing the I/O bus device to retry its request through the retry mechanism provided on the I/O bus. Where both busses provide a retry mechanism, the I/O interface may be designed to efficiently determine which bus device should be made to retry its request. Generally, the technique of avoiding deadlocks requires complex retry mechanisms which necessarily require additional hardware.

In order to address the lengthy access time required for I/O device accesses and avoid the problems associated with stalling the system bus, pended system buses have been implemented. On a pended system bus, a CPU gains control of the system bus and initiates a transaction. The CPU then gives up control of the system bus. In the case of a write, the computer system can implement dump-and-run writes as described above, i.e., the CPU continues processing assuming the write completes and then must be capable of responding to errors which are reported late, or the computer system can implement pended writes where the CPU waits for status to be returned from the device to which the transaction was directed before continuing processing (the CPU could implement a pended write, continue processing and use the status as a check, but the CPU would need to employ an error recovery mechanism which is able to respond to late reported errors). In the case of a read, the CPU waits for the read data and status to be returned. When the CPU gives up control of the system bus after initiating a transaction, other CPUs (or the CPU which initiated the I/O device access) or system bus devices, including those capable of conducting DMA transfers, can gain control of the system bus and conduct useful work. Thus, pended system buses do not waste system bus cycles by stalling the system bus while waiting for an I/O device access to complete.

In the case of a pended read or write, a CPU gains control of the system bus through an arbitration mechanism and initiates transactions by sending at least an address, a command, a requester identification (ID), (i.e., the ID of the CPU making the request), and data to be written in the case of a write. A system bus device (i.e., main memory, I/O interface, etc.) to which the address of the transaction corresponds may be capable of accepting the number of outstanding requests from each other system bus device. However, where the system bus device which recognizes the address as one to which it must respond is not capable of accepting the number of outstanding requests from each other system bus device, the system bus device must either accept the transaction or indicate that it can not. One way to indicate that it can not accept the transaction is through the use of a "busy" signal. If the CPU receives a busy signal (or is otherwise informed that the transaction has not been accepted), the CPU will generally retry the transaction, possibly after waiting a certain period of time, i.e., a retry delay. If the device accepts the transaction, the device stores at least the requester ID and write data in the case of a write. When the transaction has been completed with the I/O device, the system bus device arbitrates for control of the system bus, uses the requester ID as the address, and returns the status of the transaction, including whether the transaction completed, whether any errors were encountered while completing the transaction, and read data in the case of a read, to the CPU which requested the transaction.

In the case of an I/O device access, the address provided by the CPU is one to which the I/O interface will respond. The I/O interface stores at least the address, the command, the requester ID, and the write data in the case of a write. The I/O interface then arbitrates for control of the I/O bus and executes the I/O device access. The I/O interface then notifies the initiating CPU that the I/O device access is complete, and the I/O interface also notifies the CPU of any errors which were detected and provides the read data in the case of a read.

Generally on a pended system bus, the I/O interface is capable of accepting multiple I/O device access requests. For each accepted request the buffering hardware required for the above described read and write transactions must be replicated. An I/O interface could be provided which is capable of accepting a number of requests equal to the number of possible outstanding requests, however, additional hardware would be required to buffer all of the possible outstanding requests. Where the I/O interface accepts multiple I/O device access requests, but less than the number of possible outstanding requests, the I/O interface must be capable of indicating that it can not accept a request after it has accepted the limited number of requests, (i.e., send a busy signal to the CPU).

As mentioned above, when the CPU receives a busy signal from the system bus device to which the transaction was directed, the CPU may retry the transaction. The CPU may either wait a retry delay before re-initiating the transaction or the CPU may monitor the system bus and wait for the device to be accessed to return the status of a previously accepted transaction (indicating that the device may now be free to accept another transaction) before re-initiating the transaction. The retry delay is usually implemented in hardware in a similar manner to the timeout hardware discussed above in relation to deadlocks. A clock providing a signal to a counter is often used to count clock cycles, and when the counter reaches a predetermined number of clock cycles indicating the retry delay has been met, a signal is sent to retry hardware which will re-initiate the transaction. Similarly, if a monitoring technique is used, hardware is required to monitor the bus to determine if the device to be accessed has returned the status of a previously accepted transaction. In order to prevent the computer system from hanging, often there is also hardware which keeps track of the number of busy responses a CPU receives for a given transaction, such that when a maximum number of busy responses is received an error is flagged. If the CPU has more than one processor on board or is otherwise capable of initiating multiple transactions, the CPU will usually replicate the retry delay or monitoring hardware and busy response counter hardware for the number of outstanding transactions which the CPU is capable of initiating.

Generally, in order to gain control of the system bus, devices resident on the system bus and capable of gaining control of the system bus arbitrate (i.e., request control of the system bus) according to a predetermined arbitration scheme. Many arbitration schemes assign priorities to the devices capable of gaining control of the system bus such that the device with the highest priority which requests control of the system bus will "win" the arbitration and be granted control of the system bus. The priority of the devices may change to allow for a fair distribution of control of the system bus among the devices capable of such control.

In a computer system implementing a pended system bus, the I/O interface includes arbitration hardware such that the I/O interface may gain control of the system bus in order to return status (and read data in the case of a read transaction) to the CPU which requested the I/O device access. Generally, a more complex arbitration scheme which allows the I/O interface to have the highest priority is necessary to avoid degrading the performance of the computer system. For example, where an arbitration scheme is provided in which the highest arbitration priority is equally shared by CPUs and other devices such as the I/O interface, if a CPU currently having a higher arbitration priority than the I/O interface has control of the system bus and is trying to make an I/O device access, the CPU will receive the busy signal from the I/O interface if the I/O interface has accepted all the I/O device accesses that it is capable of accepting. In this situation, the I/O interface may be trying to gain control of the system bus to return status and possibly read data, however, the I/O interface could not immediately gain control of the system bus because the CPU had the highest arbitration priority. The I/O interface may eventually be able to gain control of the system bus by receiving the highest arbitration priority, but system bus cycles are wasted and the time required to complete the I/O device access is increased while waiting for the I/O interface to gain control of the system bus. On a pended system bus, the number of I/O device access requests and the number of responses required to complete the I/O device accesses are about equal.

Therefore, the situation described above could happen regularly and, hence, quickly degrade performance. In order to avoid this situation, the I/O interface is assigned the highest priority arbitration request such that when the I/O interface is ready to execute a response transaction to return status and possibly read data, it will gain control of the system bus following the completion of any current transaction regardless of the other devices requesting control of the bus. This arbitration scheme avoids the above described problem, but necessarily increases the complexity of the arbitration scheme.

In order to detect uncompleted transactions on a pended system bus, a system bus device, such as a CPU, will generally employ two types of timers. The hardware required for these timers will be similar to the hardware required to detect a deadlock on a stalling system bus as described above. The first type of timer will be a current transaction timer. The current transaction timer is started when the system bus device gains control of the system bus to initiate a transaction on the bus. If the system bus device subsequently gives up control of the system bus indicating that the transaction has been initiated, then the current transaction timer is stopped and cleared. If the system bus device does not give up control of the system bus prior to the current transaction timer timing out, then an error is flagged. This generally indicates that the system bus is hung.

The second type of timer is an individual transaction timer. The individual transaction timer is started when the system bus device gains control of the system bus and initiates the transaction, but is not stopped until the status is returned (and data in the case of a read) indicating that the transaction is completed. Thus, if a busy is received and the transaction must be retried, the individual transaction timer is not restarted. If a system bus device is capable of initiating more than one transaction on the system bus, then it will generally have one individual transaction timer for each possible outstanding transaction. If an individual transaction timer times out prior to completion of the transaction, then an error is flagged.

Furthermore, to detect uncompleted transactions on I/O buses, the I/O interface will generally also employ a current transaction timer for each I/O bus that is connected to the I/O interface and individual transaction timers for the number of transactions that it has initiated on the I/O buses if the I/O bus to which it is connected is a pended bus.

A pended system bus also provides a risk of causing "starvation". When the I/O interface accepts as many I/O device accesses as it is capable of accepting, the I/O interface will signal that it is busy to other I/O device access requests. If the I/O interface indicates that it can not accept an I/O device access from a system bus device, for example, CPU1, then CPU1 will need to retry the transaction as described above. Following the completion of an I/O device access, if the system bus device which initiated the just completed I/O device access or if a system bus device already having one or more outstanding I/O device accesses initiates another I/O device access prior to CPU1 retrying its request, the request made by the other device will be accepted by the I/O interface and CPU1 will again receive a busy response. When the I/O interface repeatedly rejects the I/O device access requested by CPU1 it is termed a starvation of CPU1.

Another problem with accessing devices on I/O buses is that of addressing them. Each I/O bus will have an addressing scheme for accessing the devices on the bus. The computer system must provide for accessing devices on the system bus as well as for accessing I/O devices on the I/O bus directly connected to the I/O interface and on remote buses. Often, the system bus provides a set of address lines beyond those needed to address the devices on the system bus which are only used to address I/O devices connected to I/O interfaces. The number of system bus address lines is determined by the size of the largest address which the processor can provide. Thus, this method may require a large number of address lines, and some address space on an I/O bus or on remote buses may not be accessible by a CPU on the system bus where the CPU is incapable of producing a sufficiently large address.

A previous attempt to reduce the number of address lines and provide for access to all I/O space involved the use of mapping registers. A mapping register is a register generally located on an I/O interface and used by the I/O interface to supply some portion of the I/O bus address bits. A mapping register is loaded by a CPU prior to the CPU making an I/O device access request. The I/O interface uses the mapping register bits as the address or part of the address on the I/O bus after it receives the I/O device request from the CPU.

The bits contained in a mapping register may be used in many ways. For example, if the I/O bus has a larger address space (for example, sixty-four bits) than the system bus (for example, thirty-two bits) the mapping register may contain the necessary additional address bits (thirty two bits) to provide access to the full I/O address space (sixty-four bits). Often, the mapping register is larger than the number of necessary additional (thirty-two bits) address bits, because one or more system bus address bits may be needed to signify that the address is to I/O space to which the I/O interface will respond and therefore, these bits will be unavailable as I/O bus address bits. In such a case, the mapping register will need to contain the number of necessary additional bits (thirty-two bits) as well as the number of bits required to indicate that the I/O interface should respond.

Generally, a mapping register contains the most significant I/O bus address bits such that if a CPU makes several consecutive I/O device access requests to the same general I/O bus address space (i.e., the I/O space covered by the most significant I/O bus address bits held in the mapping register), the CPU need only change the least significant address bits which are provided on the least significant system bus address lines. In this way, the mapping register will only need to be updated prior to the CPU making an I/O device access request to an I/O bus address space outside of the general I/O address space contained in the mapping register.

In general, it is impractical to have only one mapping register available on the I/O interface, because each CPU may need to write the mapping register prior to each initiated I/O device access due to the fact that this register will be shared by all the CPUs on the system bus. Thus, the I/O interface generally includes one mapping register for each CPU on the system bus.

The use of mapping registers requires complicated software management of shared resources since mapping registers must be modified before accessing a new address range on the local I/O bus or the remote bus. Each time the mapping registers need to be modified, system bus cycles are used which reduces the performance of the computer system.

Yet another problem with accessing devices coupled to the I/O bus directly connected to the I/O interface or coupled to remote buses is that of the type of operations that are involved. Often the system bus only supports large size operations such as longword (thirty-two bit) transactions or quadword (one hundred and twenty-eight bit) or greater in order to optimize performance. Similarly, the computer system may limit the type of functional operations which are allowed. Unfortunately, some I/O devices depend on smaller size operations such as byte (eight bit) operations or functional operations which are not contained in the limited system bus functional operations to operate correctly.

Alternative solutions to this operation availability problem have been to force necessary I/O bus operations into the instruction set of the system bus or to provide function type registers. The bits in a function type register are used to determine which type of transaction will be executed on the I/O bus or which bytes of data in a transaction contain valid data (i.e., the bits form a byte mask). The I/O interface may use these bits to determine which transaction is to be sent on the I/O bus or which data in a transaction is to be sent on the I/O bus or retrieved from the I/O bus using the operations (byte, word, etc.) available on the I/O bus. Each of these solutions involves complex hardware and software management. The use of function type registers degrades the performance of the computer system in that each time the function type registers need to be modified, system bus cycles are used.

SUMMARY OF THE INVENTION

In accordance with the present invention, an apparatus includes a system bus coupled to an I/O interface which includes means for storing, illustratively a register here referred to as a pointer register and a logic circuit which determines whether a write to the means for storing (or pointer register) will be accepted or rejected. The system bus is also coupled to a Central Processing Unit (CPU) which is capable of executing software instructions to provide a command structure corresponding to an access of a device indirectly connected to the system bus via the I/O interface. The CPU executes an instruction to provide to the pointer register data corresponding to an address of a location of the command structure. The CPU further includes a hardware indicator responsive to the logic circuit for providing a status signal indicating the status of a write to the pointer register. The CPU executes a subsequent instruction in accordance with the status signal. With such an arrangement, an apparatus for accessing devices indirectly connected to a system bus of a computer system is provided which allows the instruction executed by the CPU to software pend accesses to devices not directly connected to the system bus. This improves system performance over non-pended system buses and reduces the amount of hardware needed as compared to pended system buses.

In accordance with a further aspect of the invention, a first embodiment of the hardware indicator includes a register having a bit which is set if the rejecting circuit rejects a write from the CPU to the pointer register. This allows the status of the CPU write to the pointer register to be visible to the software being executed by the CPU without having to access the I/O interface via the system bus.

In accordance with a further aspect of the invention, a second embodiment of the hardware indicator includes a register which is internal to a processor chip on the CPU, with the internal register having a bit which is set if the rejecting circuit rejects a write from the CPU to the pointer register. This allows the status of the CPU write to the pointer register to be visible to the software being executed by the CPU without having to access a register external to the processor chip.

Both embodiments of the invention allow devices which are indirectly connected to a system bus of a computer system to be accessed by CPUs resident on the system bus without having to stall the system bus. The software being executed by the CPU software pends these accesses which eliminates the need for hardware timers such as retry delay timers and various transaction timers, hardware retry mechanisms, and other hardware associated with hardware pended system buses. Deadlocks and the hardware associated with overcoming deadlocks are also eliminated by allowing the CPU to execute the software in accordance with the status signal provided by the hardware indicator. The invention provides a technique to address all devices indirectly connected to the system bus through the I/O interface and use the various functional and size operations available to these devices.

In accordance with a further aspect of the invention, a method of operating a computer system includes the steps of storing a set of data in a memory corresponding to a request by a CPU for an I/O device access from an I/O interface, and writing data to a storage device on the I/O interface, using an instruction which causes a status signal indicator to provide a status signal to which a succeeding instruction is responsive, with the data being related to an address of a location of the set of data stored in the memory. With such an arrangement, a method for accessing devices indirectly connected to a system bus of a computer system is provided. This method allows instructions being executed by the processor to software pend accesses to devices not directly connected to the system bus. This improves system performance over non-pended system buses and reduces the amount of hardware needed as compared to pended system buses.

DETAILED DESCRIPTION OF THE PREFERRED EMBODIMENTS

As noted above, this invention involves a method and apparatus for accessing devices indirectly connected to a system bus of a computer system via an I/O interface while improving system performance over non-pended system buses and reducing the amount of hardware required compared to pended system buses. As previously mentioned, I/O devices hereinafter refer to devices resident on local I/O buses directly connected to the I/O interface as well as devices connected to remote buses which are coupled to local I/O buses via adapter modules. The indirect access of I/O devices is accomplished through software pending of I/O device access requests which, when used on a non-pended system bus, prevents the degradation of system performance associated with wasting system bus cycles by stalling the system bus until an I/O device access is complete. Thus, the system bus is not stalled during an I/O device access similar to a pended system bus while the complexities associated with a pended system bus are avoided. This method and apparatus may be used in a computer system which implements a pended system bus, however, the preferred embodiment of the invention employs a non-pended system bus.

Figure 1:
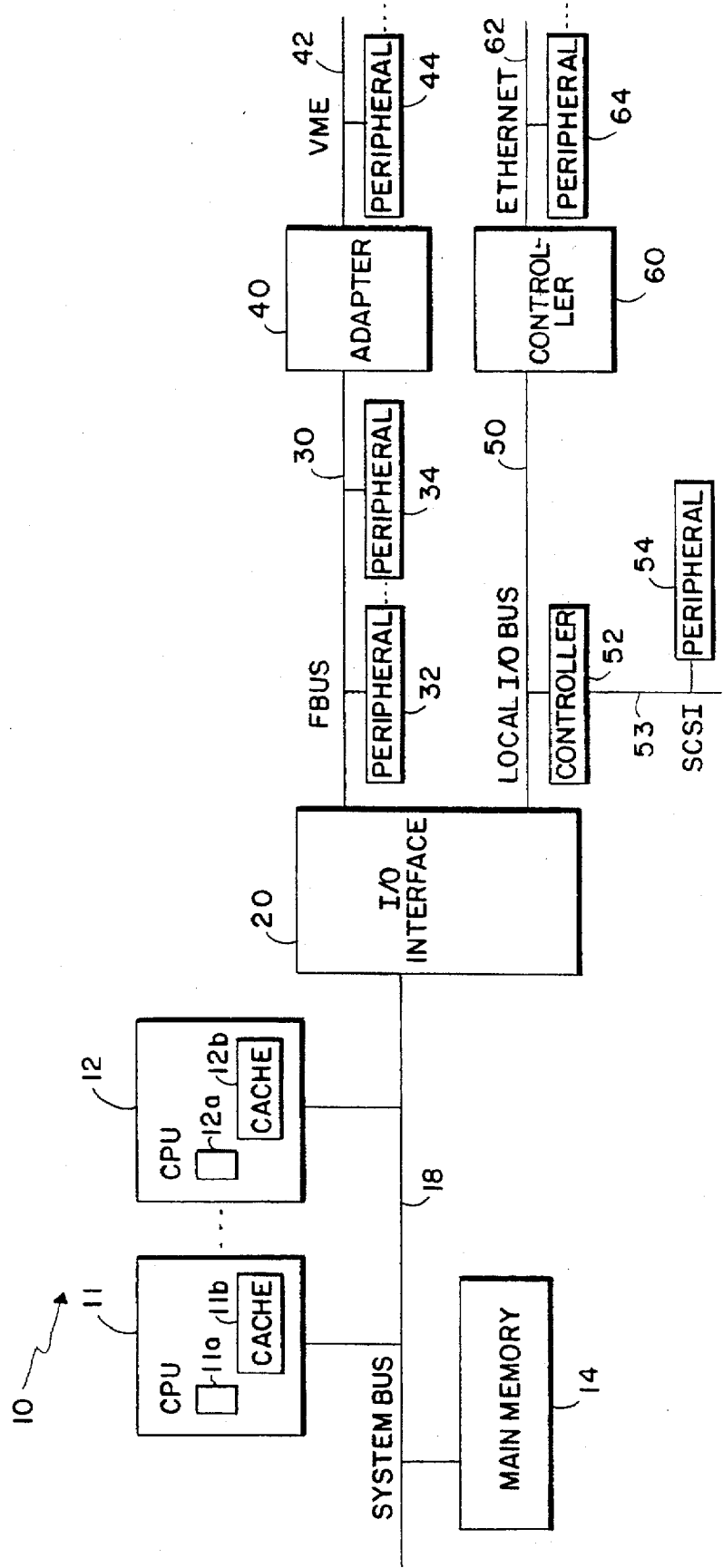
FIG. 1 is a block diagram of a computer network having a system bus coupled to multiple I/O buses by an I/O interface.

Referring now to FIG. 1, a computer network 10 is shown to include multiple central processing unit (CPU) modules, hereinafter referred to as CPUs, including CPU 11 and 12. Each CPU further includes a processor integrated circuit component, hereinafter referred to as processors, 11a and 12a and a cache memory 11b and 12b, respectively. The computer system may include more than two CPUs, however, FIG. 1 only shows two for simplicity. FIG. 1 also shows a main memory 14 which may be comprised of a plurality of main memory modules, but for simplicity is shown as one device. FIG. 1 also shows an I/O interface 20 coupled to the main memory 14 and the multiple CPUs 11, 12 via system bus 18.

The computer network 10 further includes I/O buses 30 and 50 which are coupled to the I/O interface 20. The preferred I/O buses are those which implement addressable loads and stores as opposed to message passing, although, message passing buses may be accessed through an I/O bus controller. As an example, I/O bus 30 may be an addressable load and store bus such as a Futurebus+I/O bus (Institute for Electrical and Electronic Engineers—IEEE STD. 896) and I/O bus 50 may be a system specific local I/O bus which connects to a controller 52 which interfaces with a message passing bus 53 which may be a Small Computer System Interconnect bus (SCSI, American National Standard Institute —ANSI STD. X3.131) and a controller 60 which interfaces with a message passing bus 62 which may be an Ethernet bus (IEEE STD. 802). Also shown are I/O devices 32, 34, and 54 which connect to I/O bus 30 and I/O message passing bus 53 respectively. These I/O devices may be disk drives, tape drives, printers, etc. Also shown coupled to I/O bus 30 is adapter device 40. The adapter 40 is additionally coupled to remote bus 42. Remote bus 42 may be an I/O bus or another computer system bus. As an example, bus 42 may be a VME bus (IEEE STD. 1014). I/O device 44 is also shown coupled to bus 42. There may be more than the number of I/O devices shown on buses 30, 50, 42, and 62, however, for simplicity, the number of I/O devices is limited to those shown in FIG. 1.

The I/O interface 20 couples the multiple CPUs on the system bus to the devices on the local I/O buses 30 and 50 and to the devices on the remote buses 42 and 62. The access time involved with transferring data with I/O devices is in general significantly greater than that required during a transfer of data with main memory.

Figure 2:
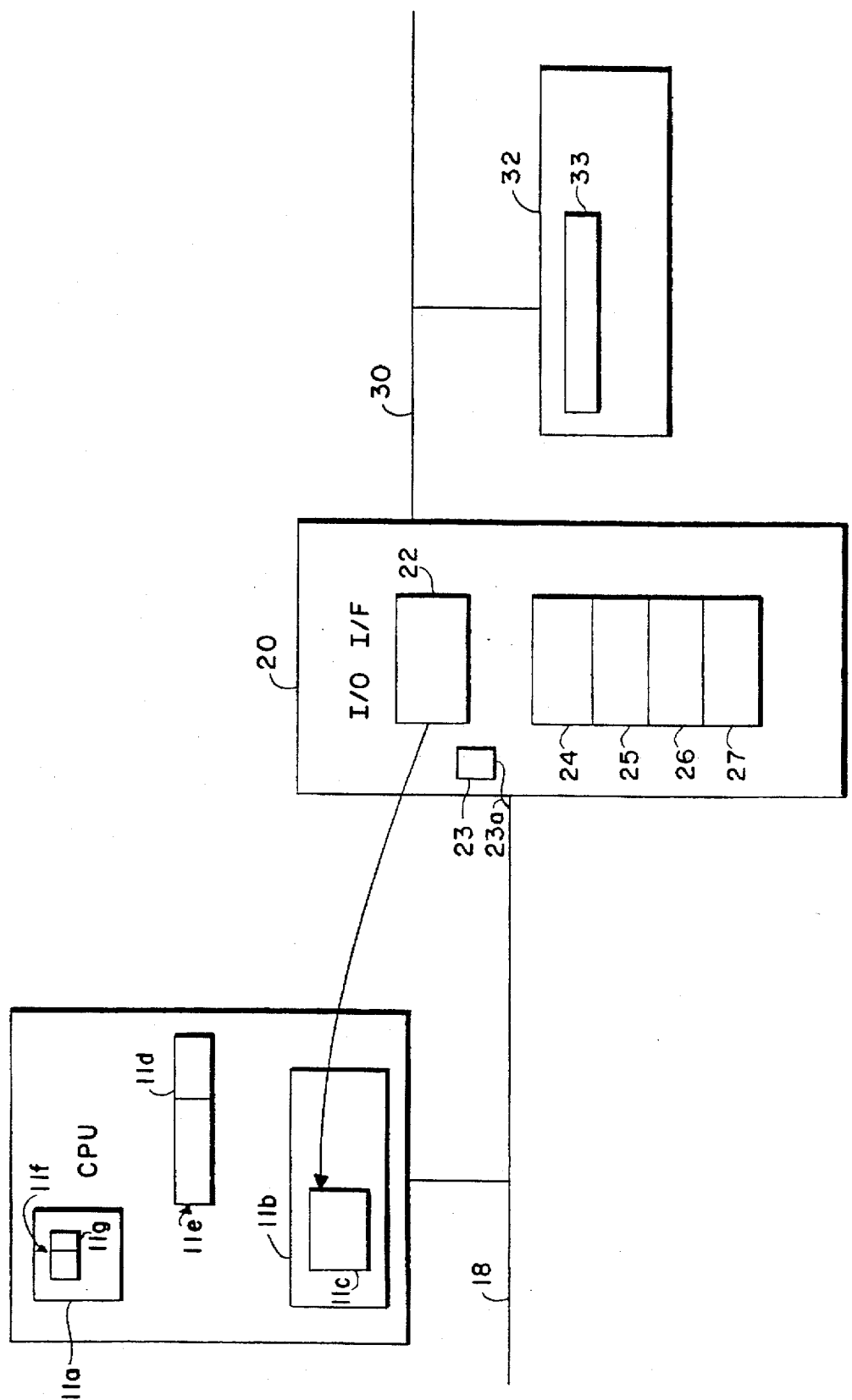
FIG. 2 is a more detailed block diagram of a portion of the computer network of FIG. 1 showing a first embodiment of the invention.

Referring now to FIG. 2, CPU 11 is shown coupled to I/O interface 20 through system bus 18. CPU 11 is shown to include inter alia processor chip 11a and cache 11b which contains a copy of a block of data, here a command structure 11c, retrieved from main memory into which CPU 11 writes a set of data containing the information necessary for the I/O interface to access an I/O device. I/O interface 20 is shown to include a pointer register 22. CPU 11 writes an address to pointer register 22. This address corresponds to the location in main memory 14 (cache 11b may respond to a request on the system bus 18 for an access to this location) of the command structure 11c. I/O interface 20 is also shown to include a rejecting circuit 23. The rejecting circuit 23 determines whether the pointer register 22 contains an address corresponding to a command structure which represents an uncompleted I/O device access. If the rejecting circuit 23 determines that the pointer register 22 does contain an address corresponding to an uncompleted I/O device access, it will indicate that it is busy by asserting a busy signal 23a. As previously mentioned, there are other ways for the rejecting circuit 23 to indicate that the I/O interface 20 is busy with a previously accepted write to pointer register 22. I/O interface 20 is further shown to include a set of registers 24, 25, 26, 27 (24–27) which can be loaded by the I/O interface with the command structure 11c retrieved from cache 11b, as will be described. FIG. 2 further shows I/O interface 20 coupled to I/O device 32 via I/O bus 30. I/O device 32 is shown to include a control and status register (CSR) 33.

In order for CPU 11 on system bus 18 to access CSR 33 on I/O device 32, software instructions executed by processor chip 11a first causes CPU 11 to produce a command structure 11c. In a computer system which does not implement a caching scheme, CPU 11 would store the command structure 11c in main memory 14. In a computer system which does implement a caching scheme (i.e., each CPU 11, 12 contains a cache memory 11b, 12b respectively as shown in FIG. 1), CPU 11 stores the command structure 11c in main memory 14 which may include cache memory 11b in accordance with the caching scheme. Here a caching scheme is provided to improve system performance as will later be described. In either case, the software being executed by processor chip 11a then includes an instruction to cause CPU 11 to write the address of the location in main memory 14 (cache 11b may respond to a system bus request for this location) of the command structure 11c to pointer register 22.

If the rejecting circuit 23 determines that the I/O interface 20 cannot accept a write to the pointer register 22, the rejecting circuit 23 will assert the busy signal 23a to indicate to the CPU 11 that the write was not accepted (i.e., the I/O interface 20 is busy, as previously described). The "busy" status is recognized by an instruction within the executing software in the processor chip 11a. Recognition of the busy status by the software is accomplished through a combination of a hardware indicator (such as an internal register 11f in processor chip 11a or a register 11e external to processor chip 11a, as will be further described below) and either a sequence of standard instructions or a single specialized instruction. The hardware indicator is illustratively a busy bit, either 11d or 11g of the aforementioned corresponding registers 11e, 11f, which is set automatically by CPU 11 if the I/O interface indicates that it is busy. Other types of hardware indicators such as a simple state device could alternatively be used.

Whether the hardware indicator is an internal or external processor chip register 11g, 11d, respectively, a sequence of software instructions are executed by the processor chip 11a to write to pointer register 22 and to determine the status of that write.

Figure 3:
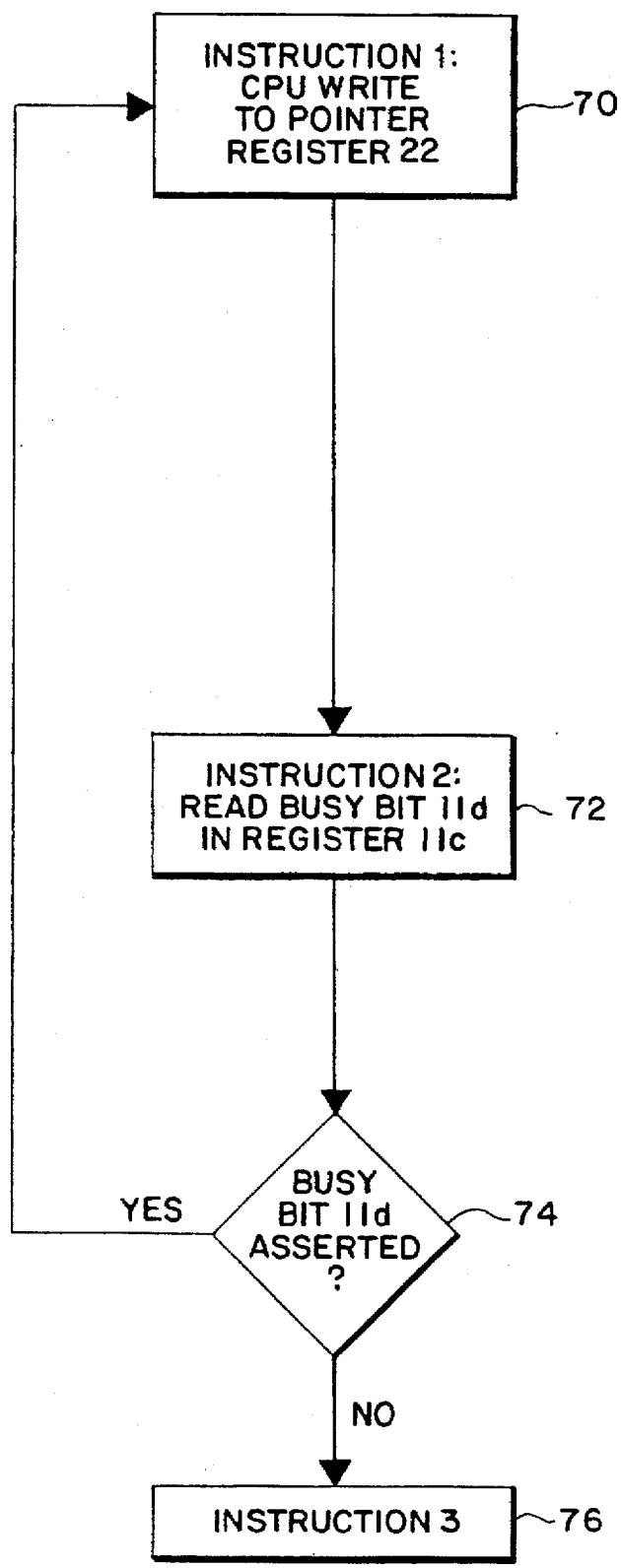
FIG. 3 is a flow chart depicting a sequence of steps for allowing software running on a CPU to determine the status of a previous write instruction.

Referring now also to the flow chart of FIG. 3, a first instruction, represented by step 70, causes CPU 11 to initiate a write to pointer register 22. Following this write, for example, the busy bit 11d in the external processor register 11e or the busy bit 11f in the internal processor register 11g (FIG. 2) is set automatically (via a bus interface circuit, not shown, which interfaces the CPU 11 to the system bus 18) if the I/O interface 20 indicates that it is busy and cannot accept the write. A second instruction, represented by step 72, then causes processor chip 11a to read busy bit 11d in external processor register 11e or busy bit 11f in internal processor register 11g. At decision step 74 a determination is made by the software running on processor chip 11a to either return to the first instruction 70 if the busy bit 11d or 11f is set or to continue on to a third instruction, represented by step 76, if the busy bit 11d or 11f is not set. This sequence of instructions allows the status of the write to pointer register 22 to be made known to the executing software. Thus, this combination of a hardware indicator and the sequence of instructions are referred to hereinafter as a software visible instruction. That is, this type of sequence of instructions allows the software being executed on the processor chip 11a to be informed of the status of the write action to the pointer register 22.

The sequence of instructions will cause the CPU 11 to initiate a write to pointer register 22 and then check the status of that write. Subsequent processing of instructions may be conditioned upon the I/O interface accepting the write to pointer register 22. Thus, the sequence of instructions may be termed a conditional write. If the I/O interface 20 indicates that it is busy, the hardware indicator provides this information to the software executing on the processor chip 11a which may stall processing of further instructions while the write to pointer register 22 is retried.

Whether an internal processor chip register 11g or an external processor chip register 11e is used as the hardware indicator, the software executing on the processor chip 11a must include an instruction which will read the register 11g or 11e to determine the status of the write. In general, it is faster to read an internal processor chip register than an external processor chip register. However, the internal processor register 11g may require specialized hardware (inter alia the dedication of bit 11f as a busy bit and any hardware required to set the bit) within processor chip 11a. Therefore, the designer will need to determine whether the speed associated with the internal processor chip register 11g is sufficiently important to warrant designing a new processor chip instead of using an existing processor chip and an external processor chip register.

Therefore, if the I/O interface does not accept the write to pointer register 22, then a hardware indicator will reflect this result and the software being executed on the processor chip 11a will retry the write. The software may wait, using a software timer, a predetermined delay (retry delay) before re-initiating the write to pointer register 22. Software timers are simple instructions which may subtract the time at which the last write attempt was initiated from the current value of a "time of day" clock which runs on most computer systems and then compare the result to the predetermined delay. These software timers require no additional hardware. When the predetermined delay has been met, the software will re-initiate the write using the same hardware which was used to initiate the original write, i.e., no retry hardware is required.

CPU 11 uses a software visible write instruction, as shown in FIG. 3, such that if the I/O interface does not accept the write to the pointer register 22, i.e., the write fails because the I/O interface 20 is occupied with a previously accepted I/O device access request, the software running on the CPU will be notified that the write did not complete. This alleviates the need for hardware retry delay timers. The software may similarly keep track of the number of busy responses for a given transaction, and thus, eliminate the need for busy response counters. This may involve the reduction of a significant amount of hardware, especially if the CPU is capable of multiple outstanding I/O device access requests.

Upon loading the pointer register 22, the I/O interface 20 would use the address loaded into the pointer register 22 to retrieve the command structure and store it in the set of registers 24–27, as mentioned above. The command structure includes all of the necessary information for the I/O interface to execute the I/O device access, including the command, the I/O bus address, optional byte masks (if necessary), data (if the command is a write), and so forth. The I/O interface 20 then executes the I/O device access, and following the completion of the I/O device access, updates the command structure in main memory to indicate to CPU 11 that the access was complete (and to write the return read data into the command structure if the command was a read).

As mentioned previously, a memory access on the system bus is required to retrieve a block of main memory into which a CPU may write a command structure. In the preferred embodiment of the invention only one system bus access is required for the CPU to gain control of enough main memory to hold the command structure, and therefore, only one system bus access is required for the I/O interface to retrieve a copy of the command structure and store it in the set of registers 24–27. If more than a single system bus access is required to store the command structure, then system performance may be degraded by the necessity to gain control of the system bus multiple times (i.e., considerable time may be lost due to arbitration), and in order to retrieve multiple blocks of data (i.e., considerable time may be lost due to a delay required to read data from main memory). If the cache already contains the required block of main memory, then no system bus cycles are required for the CPU to retrieve the command structure from main memory.

Referring again to FIG. 2, in the system just described, following production of the command structure in main memory or cache, CPU 11 would write the pointer register 22 with a software visible write instruction or sequence of instructions. If the rejecting circuit 23 accepts the write to the pointer register 22, the I/O interface 20 then would read the command structure from main memory 14 which may include cache 11b in accordance with the caching scheme. Following the completion of the I/O device access, the I/O interface 20 would write into the command structure the status of the access and the read data if the command was a read. The software running on the CPU causes the CPU to continually read the command structure in main memory to determine when the I/O device access is complete. This is often referred to as "polling". As mentioned above, the preferred embodiment of the invention includes a caching system to reduce the number of system bus cycles the CPU would take away from other devices. While the CPU is waiting for the I/O access to complete, all of the reads involved with polling are satisfied by the cache, therefore, no system bus cycles are used. When the I/O interface 20 updates the status in the command structure, the update is made available to the cache via the caching scheme. This approach also allows an I/O device access to be completed using a minimum number of system bus cycles and a minimum amount of hardware, i.e., the hardware (described above) associated with pended system buses is unnecessary both on the I/O interface, the CPU, and main memory.

Since software running on CPU 11 can determine that the I/O device access is complete, the individual transaction timers may be implemented via software. Similar to the retry delay software timers, the individual transaction timers may be implemented through software and eliminate the need for these hardware timers.

Following the acceptance by I/O interface 20 of the software visible write to the pointer register 22, the CPU may continue processing and use the return status of the I/O device access as a check. Alternatively, the CPU may wait until the status is returned to continue processing. This indirect access of I/O devices is similar to a pended bus in that other devices may use the system bus while the I/O interface is completing the I/O device access (i.e., software pending). However, by providing for an indirect access to I/O devices, the complexities and high cost of the hardware associated with a pended bus are avoided. The CPUs and the I/O interface require some additional hardware, however, in general, this additional hardware is less than the amount required for a pended system bus, and the main memory, which may include many system bus memory devices, does not require any hardware to implement software pending of I/O device accesses. Additionally, the retry delay counters, busy response counters, and individual transaction counters can be implemented in software with minimal hardware requirements. Also, very few system bus accesses are required to initiate and complete the I/O device access and therefore, system performance is increased.

In a computer system which implements a pended system bus, the number of read requests and read responses are generally equal, because all read requests are pended and thus, require a read response to complete. The number of write requests will generally also be equal to the number of write responses, where pended writes versus dump and run writes are implemented. In the computer system implementing the invention, the system bus is preferably non-pended, or may be thought of as partially software pended in that I/O device accesses are done indirectly and require a status back. Thus, in this system read and writes to I/O devices do require responses, however, the total number of read and write requests on the system bus far out number read and write requests to I/O devices which require responses. Therefore, the two level arbitration scheme described earlier, where the I/O interface has a higher priority than other system bus devices, is not necessary.

In the computer system described above, a situation may occur where a CPU has control of the system bus and is trying to write to the pointer register 22 to initiate an I/O device access, but receives the busy signal 23a due to the rejecting circuit 23 determining that the pointer register 22 currently holds an address corresponding to an uncompleted I/O device access request. In this situation, the I/O interface may be trying to gain control of the system bus to execute a read response, however, this situation will not occur as regularly as on a pended system bus where the number of read and write requests and read and write responses are equal. Thus, the performance of this system without the two level arbitration scheme will not be degraded to such a significant extent as would a pended system bus without the two level arbitration scheme. The computer system designer may balance the needs of performance against the cost of the hardware required for a two level arbitration scheme and if performance is more important, the two level arbitration scheme may be employed.

Due to the software pending or indirect access of I/O devices, system bus deadlocks, as described above, are not an issue in this system. Since, the system bus is not stalled while waiting for an I/O device access, a deadlock situation cannot arise where the I/O bus and system bus are both hung because a device on each bus has control of the bus and is waiting for indirect control through the I/O interface of the other bus. Thus, the often extensive hardware required to detect deadlocks and recover from them is unnecessary.

The invention, i.e., the indirect access of I/O devices, may be used to replace DMA operations or may be used to access I/O device CSRs to initiate a DMA operation. This choice would be left to the designer in light of the many considerations required for this decision.

The invention allows the system bus to only implement the number of address lines required to access system bus devices, i.e., local addresses. The command structure can be provided to include as many address bits as necessary to access the available I/O address space, i.e., the number of address bits required to access I/O devices on the I/O bus or on remote buses. Thus, the number of address lines is reduced to the minimum needed to access local devices, the entire I/O bus address space can be made accessible to CPUs on the system bus, and the need for mapping registers, as described above, is eliminated.

The invention also provides for full access to I/O devices while allowing the system bus to implement a limited number of operations in order to increase system performance. The command structure includes the operation or command which is to be executed on the I/O bus in order to access a desired I/O device. Thus, any of the necessary operations required by the I/O devices can be employed without forcing these operations into those implemented on the system bus. This allows the system to implement a limited number of operations to increase performance and reduce the necessary hardware required to respond or execute the operations, and function type registers and other types of operation mapping registers and the hardware associated with these registers is unnecessary on the I/O interface.

Figure 4:
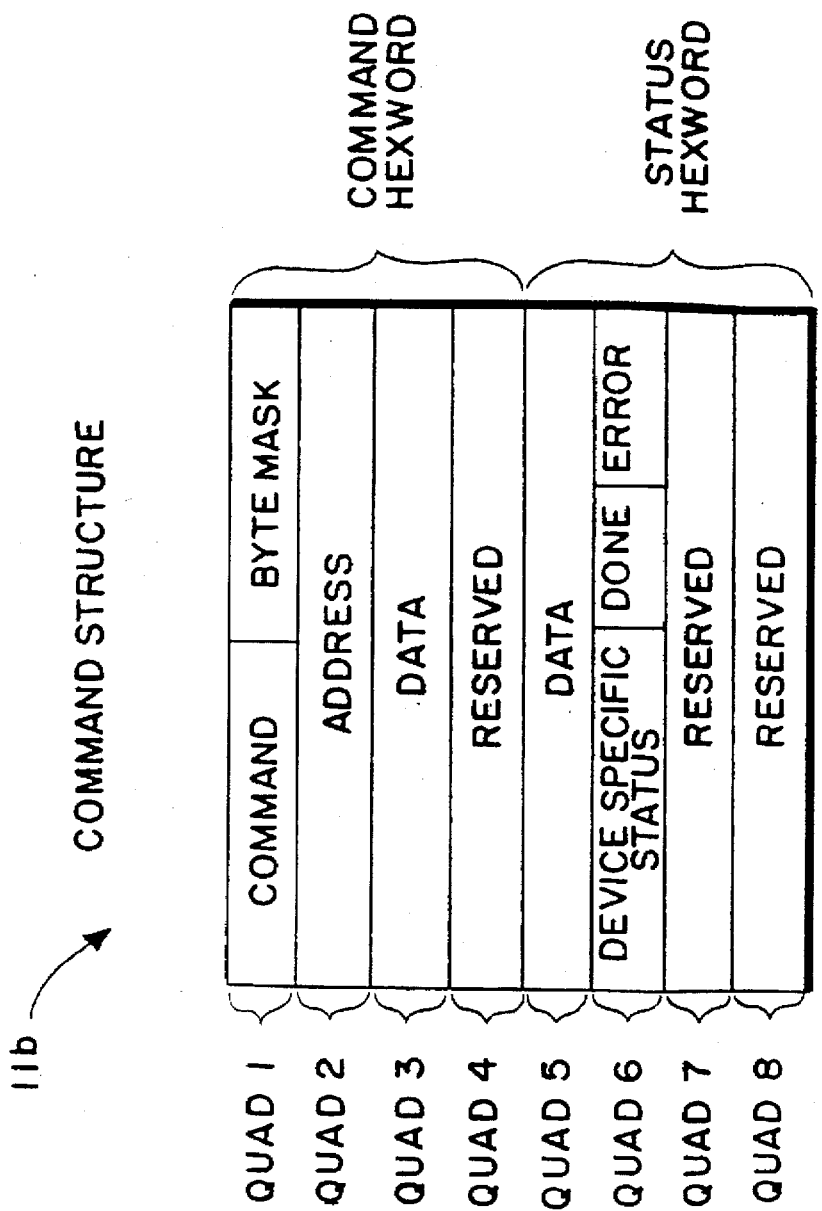
FIG. 4 depicts a typical set of data of a command structure.

Referring now to FIG. 4, an example of a command structure provided in a computer system which has a block size (i.e., system bus transfer unit) of two hexwords (five hundred and twelve bits each) of data is shown. Each hexword is divided into four quadwords (one hundred and twenty-eight bits) the upper hexword will be referred to as the command hexword and the lower hexword will be referred to as the status hexword. In this example, the first quadword, QUAD1, of the command hexword is shown to include a command and a byte mask while the second quadword, QUAD2, is shown to include an address for use on the I/O bus to access the I/O device on a local I/O bus or on a remote bus. If the access is to be a write, the third quadword, QUAD3, in the command hexword would include data to be written, and as shown in FIG. 4, the fourth quadword, QUAD4, of the command hexword is here shown to be reserved for future use. In this example, the block size provides more space than is necessary (QUAD4 is not used) to provide the current command structure, however, future command structures may use this additional space. This command structure is shown as an example and is not meant to represent the only type of command structure which could be implemented.

The command hexword contains all the information necessary for the I/O interface to execute the I/O device access. Once the I/O device access is complete, the I/O interface will update the status hexword of the command structure. Referring again to FIG. 4, the I/O interface will load data which was retrieved from an I/O device into the first quadword, QUAD5, of the status hexword if the command in QUAD1 of the command hexword was a read. The I/O interface will also load the second quadword, QUAD6, of the status hexword with device specific status, indicate that the access is complete by setting a done bit, and if any errors were detected during the access the I/O interface will set an error bit. QUAD7 and QUAD8 of the status hexword are shown to be reserved for future use.

Indirectly accessing I/O devices allows the system bus to be used for other useful work while the I/O interface carries out the I/O device access. Therefore, unlike past computer systems which stalled the system bus during the I/O device access, system bus cycles will not be wasted waiting for an I/O device access to complete, and hence, the performance of the computer system is improved. Unlike past computer systems which implemented pended system buses, a computer system which implements this invention on a non-pended system bus requires less hardware to complete the I/O device access.

Referring back to FIG. 2, the I/O interface 20 is shown to include only one pointer register 22. In this instance if CPU 11 writes pointer register 22 and then CPU 12 (FIG. 1) tries to write pointer register 22, the rejecting circuit 23 will assert the busy signal 23a in response to the write initiated by CPU 12. In this instance, a "starvation" situation, as described above, may arise.

Figure 5:
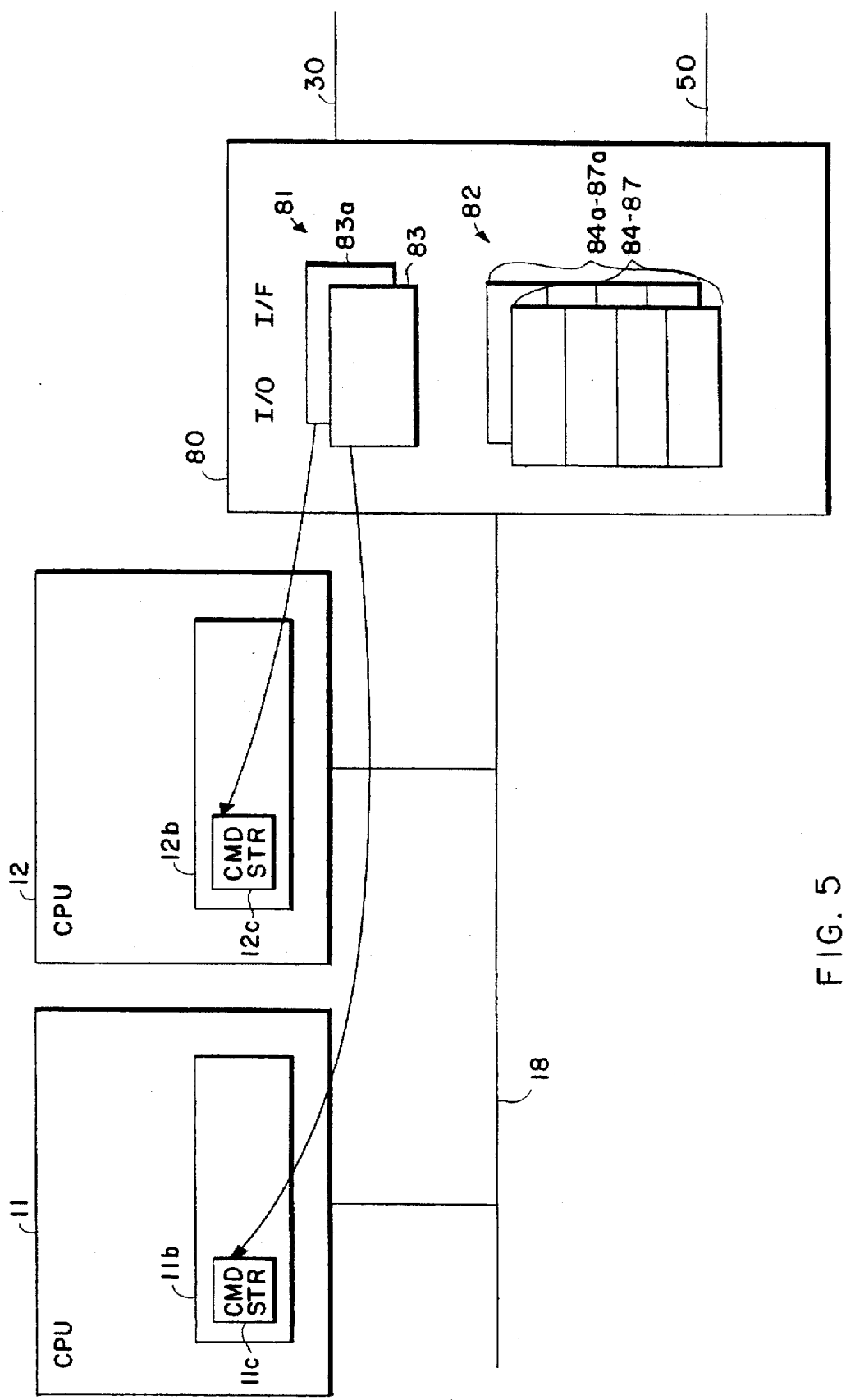
FIG. 5 is a more detailed block diagram of a portion of the computer network of FIG. 1 showing an alternate embodiment of the invention.

Referring now to FIG. 5, CPU 11 and CPU 12 are shown coupled to an I/O interface 80 through system bus 18. CPU 11 is shown to include cache 11b which contains command structure 11c, and CPU 12 is shown to include cache 12b which contains command structure 12c. The I/O interface 80 of FIG. 5 is slightly more complex than the I/O interface 20 of FIG. 2 in that there is a queue 81 of pointer registers here shown as pointer registers 83 and 83a and a queue 82 of register sets 84–87, and 84a–87a. For simplicity, FIG. 5 shows only two pointer registers 83 and 83a and two register sets 84–87 and 84a–87a, however, the I/O interface may include more than two pointer registers and more than two register sets.

When CPU 11 initiates an I/O device access, after providing the command structure 11c as described above, CPU 11 writes an address of the starting location of the command structure 11c to pointer register queue 81 on the I/O interface 80. In this embodiment, there is one local address for the pointer register queue 81 on the I/O interface 80. Therefore, CPU 11 does not write to a specific pointer register 83 or 83a, but rather to an address location which represents the queue 81 of pointer registers 83, 83a. The I/O interface 80 controls which pointer register 83 or 83a is loaded with the address depending on whether other requests have been accepted by the I/O interface 80.

If the I/O interface 80 has completed all outstanding I/O device accesses or the computer system has just been powered up and no devices have requested an I/O device access, then both pointer registers 83 and 83a are available, i.e., empty. If CPU 11 writes to the address corresponding to the queue 81 of pointer registers 83, 83a of the I/O interface 80 to request an I/O device access, then the rejecting circuit (not shown) will accept the write and the I/O interface will load the data (the address of command structure 11c) into the first available pointer register, which for this example will be assumed to be 83. If CPU 12 then writes to the address of the queue 81 of pointer registers 83, 83a on I/O interface 80, then the rejecting circuit will again accept the write and the I/O interface 80 will load the data (the address of command structure 12b) into pointer register 83a.

After the I/O interface 80 loads pointer register 83 with the address of the location of the command structure 11c, the I/O interface 80 will retrieve the command structure 11c and store the command hexword (it will not generally be necessary for the I/O interface to store the status hexword) in one of the register sets 84–87, 84a–87a of the queue 82 of register sets, in this example, register set 84–87 will be loaded first. Then, when the I/O interface 80 loads pointer register 83a with the address of the location of the command structure 12c, the I/O interface 80 retrieves command structure 12c and stores the command hexword into register set 84a–87a. If the I/O interface does not include an additional set of registers 84a–87a, then the I/O interface would wait until the I/O device access requested by CPU 11 finished before reading command structure 12b into register set 84–87.

Even where the I/O interface is connected to multiple I/O buses 30, 50 (as shown in FIGS. 1 and 5), the I/O interface may only be capable of executing one I/O device access on one I/O bus 30 or 50 at a time. In this case, the preferred embodiment of the I/O interface has at least two pointer registers 83, 83a in the pointer register queue 81 and at least two register sets 84–87, 84a–87a in register set queue 82. Even where there are more than two pointer registers 83, 83a in the pointer register queue 81, there may only be a need for two register sets 84–87, 84a–87a in the register set queue 82. One register set (for example, 84–87) can be loaded by the I/O interface 80 with the command structure 11b associated with the address loaded into the pointer register written first (for example, 83) and the second register set (for example, 84a–87a) can be loaded with the command structure 12b associated with the address loaded into the pointer register written second (for example, 83a), so that when the first I/O device access initiated by CPU 11 is completed, the second I/O device access initiated by CPU 12 can immediately be initiated on the I/O bus without a delay associated with retrieving the command structure 12b. The first set of registers (in this example, 84–87) can then be loaded with the command structure associated with an address loaded into a pointer register written third (for example, 83 or a third pointer register not shown in FIG. 5), and so forth.

If CPU 11 or CPU 12 are capable of issuing more than one I/O device access to I/O interface 80 or there are more CPUs (not shown), then the rejecting circuit will assert the busy signal to indicate that the I/O interface 80 is busy once it has accepted a maximum number of I/O device accesses (i.e., both pointer registers 83, 83a contain addresses of command structures associated with uncompleted I/O device accesses). A hardware indicator on the CPU, as describe above, will reflect the response of the I/O interface such that software running on the CPU which caused the CPU to initiate the write to a pointer register will be notified as to whether the write was accepted or busied. If the write was busied, the software may retry the request. Again, a starvation situation may arise, however, the likelihood of this happening reduces as the number of pointer registers 83, 83a increases.

Figure 6:
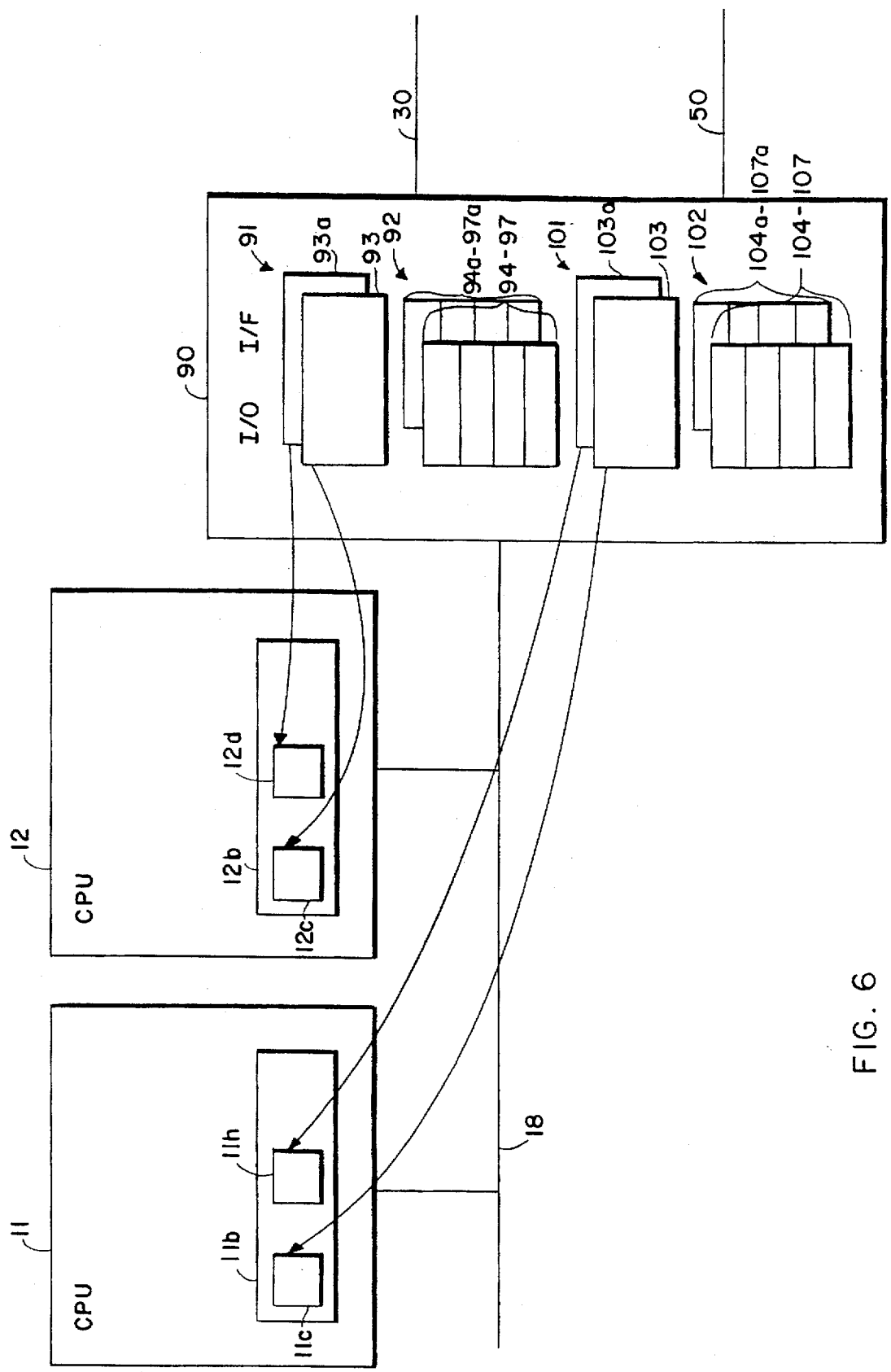
FIG. 6 is a more detailed block diagram of a portion of the computer network of FIG. 1 showing a further alternate embodiment of the invention.

Referring now to FIG. 6, CPU 11 and CPU 12 are shown coupled to an I/O interface 90 through system bus 18. CPU 11 is shown to include cache 11b and command structures 11c and 11h. CPU 12 is shown to include cache 12b and command structures 12c and 12d. The I/O interface 90 of FIG. 6 is slightly more complex than the I/O interface 80 of FIG. 5 in that there are two pointer register queues 91 and 101 and two register set queues 92 and 102. As shown in FIG. 6 pointer register queue 91 includes pointer registers 93 and 93a, pointer register queue 101 includes pointer registers 103 and 103a, register set queue 92 includes register sets 94–97 and 94a–97a, and register set queue 102 includes register sets 104–107 and 104a–107a. For simplicity, the pointer register queues 91 and 101 are shown to include two pointer registers each and register set queues 92 and 102 are similarly shown to include two register sets each, however, each queue could include more than two pointer registers or register sets respectively.

In this embodiment of the invention, CPU 11 and CPU 12 are capable of initiating more than one outstanding I/O device access request. For simplicity, FIG. 6 shows caches 11b and 12a having two command structures in each of their respective caches, however, it is to be understood that more than two command structures may be held in each cache. Also in this embodiment of the invention, pointer register queue 91 is dedicated to CPU 12 and pointer register queue 101 is dedicated to CPU 11. For each additional CPU (not shown) on system bus 18, there would be a corresponding pointer register queue (not shown). Each pointer register queue 91, 101 has an associated local address. For CPU 11 to request an I/O device access on either I/O bus 30, 50, CPU 11 writes an address of a location of an associated command structure to pointer register queue 101 using the local address associated with that pointer register queue. In the same respect, for CPU 12 to request an I/O device access, CPU 12 writes an address of a location of an associated command structure into pointer register queue 91 using the local address associated with that pointer register queue. The associations of the pointer register queues 91, 101 with specific CPUs 12 and 11 respectively was chosen arbitrarily.

Here, the I/O interface 90 is capable of simultaneously issuing I/O device requests on each I/O bus 30, 50 connected to it. The register set queues 92 and 102 can be associated with each I/O bus 30, 50 or with each pointer register queue 91, 101. In the preferred embodiment, the register set queues 92, 102 are associated with each I/O bus, and there are at least two register sets per queue. The I/O interface 90 uses the information in the command structure to determine which register set queue 92, 102 to load the command structure into (i.e., which I/O bus 30, 50 the I/O device to be accessed is resident on). For each I/O bus, one register set 94–97, 94a–97a, 104–107, or 104a–107a can be loaded with the command structure containing the I/O device access to be presently executed on the associated I/O bus, and the second register set can be loaded with the command structure containing the next I/O device access to be executed on the associated I/O bus. This allows the I/O interface to begin a next I/O device access immediately following the completion of a currently executing I/O device access for each I/O bus.

Associating a register set queue with each I/O bus requires less hardware than associating a register set queue with each pointer register queue. For example, in a computer system which is comprised of three CPUs connected via a system bus to an I/O interface which is in turn connected to two I/O buses, if the I/O interface has a pointer register queue associated with each CPU and a register set queue associated with each pointer register queue, the I/O interface will have three pointer register queues and three register set queues. However, in a similar computer system, an I/O interface which associates a pointer register queue with each CPU and associates a register set queue with each I/O bus, will have three pointer register queues, but only two register set queues.

In the computer system which implements the I/O interface which associates the register set queues with the pointer register queues, one register set queue is unnecessary. For example, if each CPU makes two I/O device access requests, then because there can only be two I/O device requests being executed simultaneously (one on each I/O bus), there will necessarily be four register sets holding future I/O device access requests (two register sets will be holding currently executing I/O device access requests). In other words, there may be more than one register set per I/O bus containing the command structure for a next I/O device access request which is a waste of hardware, because only one I/O device access can be executed on each I/O bus at a time. Therefore, in the preferred embodiment, there are two register sets associated with each I/O bus which is the most efficient use of the hardware.

Associating one pointer register queue 91, 101 with each CPU 11, 12 on system bus 18 prevents starvation, because the rejecting circuit (not shown) on the I/O interface 90 will accept at least one (in this embodiment, at least two) pointer register writes from each CPU. Therefore, one CPU (or a group of CPUs) cannot starve another CPU from access to a pointer register on the I/O interface and hence, from the I/O buses connected to the I/O interface.

The command structures which have been discussed may exist anywhere within main memory and depending on the system, the command structures may be comprised of a variety of information. Under control of software running on the CPUs, either CPU may construct common command structures and store them at specific locations in main memory. When a common command structure is to be used, the software will cause the CPU to call that command structure into the respective cache. This arrangement reduces the amount of time needed to provide a command structure once the block of main memory is resident in cache. The CPU may only need to modify an existing command structure instead of providing an entirely new command structure.

Although the preferred embodiments of the invention have been described in reference to specific organizations of the pointer register queues and register sets on an I/O interface, it will become apparent to one of skill in the art that there are many possible organizations of the pointer register queues and register set queues depending on the number of I/O buses connected to the I/O interface, the number of CPUs resident on the system bus, and other system parameters and design objectives.

Having described preferred embodiments of the invention, it will now become apparent to one of skill in the art that other embodiments incorporating their concepts may be used. Accordingly, it is submitted that the invention should not be limited to the disclosed embodiments, but rather should be limited by the spirit and scope of the appended claims.

What is claimed is:

1. An apparatus, comprising:
   a system bus;
   a main memory coupled to said system bus;
   an I/O interface coupled to said system bus, said I/O interface including;
   means for storing; and
   means for rejecting a write to said storing means; means coupled to said system bus, for executing software instructions, said software instruction including an instruction or a sequence of instructions which cause said executing means to initiate a write to said storing means;
   means for providing a set of data corresponding to a request from said executing means to said I/O interface and for storing said set of data as a data structure in said main memory;
   means, responsive to said rejecting means and said writing means, for providing a status signal indicating the status of a write by said writing means to said storing means with said instruction or sequence of instructions including a software visible instruction performing different sequences of operations in response to said status signal which permits the software visible instruction to check the status of the write to the storing means by checking the status signal; and
   wherein said executing means executes subsequent software instructions in accordance with said status signal.

2. The apparatus according to claim 1, wherein said storing means is a pointer register.

3. The apparatus according to claim 1, wherein said executing means is a Central Processing Unit (CPU).

4. The apparatus according to claim 1, wherein said I/O interface is responsive to an accepted write, for retrieving said set of data from said main memory, and storing said set of data into a set of registers.

5. The apparatus according to claim 4, wherein said I/O interface is coupled to an I/O bus having a plurality of I/O devices connected thereto and wherein said request from said executing means includes a request for an access of one of said plurality of I/O devices.

6. The apparatus according to claim 5, wherein said executing means further includes a cache memory with said cache memory temporarily storing said set of data.

7. The apparatus according to claim 4, wherein said set of data includes:
   a command portion including a command field, a byte mask field, an address field, and a write data field; and
   a status portion including a read data field, a device specific status field, a done field, and an error field.

8. The apparatus according to claim 7, wherein said I/O interface updates said status portion of said set of data in said main memory following completion of said request from said executing means.

9. The apparatus according to claim 8, wherein said executing means further includes a cache memory, with said cache memory temporarily storing said set of data, and wherein said update by said I/O interface updates said set of data in said cache memory.

10. The apparatus according to claim 9, wherein said software instructions are responsive to said update.

11. The apparatus according to claim 1, wherein said system bus is non-pended.

12. The apparatus according to claim 1, wherein said status signal providing means includes a register having a bit which is set if said rejecting means rejects a write from said executing means to said storing means.

13. The apparatus according to claim 12, wherein said register is an internal register in a processor chip.

14. The apparatus according to claim 13, wherein said software instructions further cause said executing means to initiate a write to said storing means and which examines said internal processor chip register to determine the status of said write to said storing means.

15. The apparatus according to claim 5, further including a plurality of said executing means.

16. The apparatus according to claim 15, wherein each of said plurality of said executing means includes said means for providing a set of data and said means for writing to said storing means.

17. The apparatus according to claim 16, wherein said I/O bus is one of a plurality of I/O buses, and wherein said I/O interface is coupled to said plurality of I/O buses.

18. The apparatus according to claim 17, wherein said storing means is one of a plurality of storing means which form a queue where each one of said plurality of storing means in said queue is accessible at the same address on the system bus, and wherein said rejecting means rejects a write to said queue when said plurality of storing means in said queue contain addresses of locations in said main memory of sets of data corresponding to uncompleted requests from executing means.

19. The apparatus according to claim 18, wherein said I/O interface completes one I/O device access on one I/O bus at time by retrieving a set of data in said main memory at said location contained in a first one of said storing means in said queue, and storing said set of data in said set of registers.

20. The apparatus according to claim 18, wherein said I/O interface is completes one I/O device access on each of said plurality of I/O buses simultaneously and includes one of said set of registers for each of said plurality of I/O buses.

21. The apparatus according to claim 18, wherein said I/O interface completes one I/O device access on each of said plurality of I/O buses simultaneously and includes a plurality of said set of registers for each of said plurality of I/O buses.

22. The apparatus according to claim 18, wherein said queue is a plurality of queues where each of said storing means in one of said queues is accessible at the same address on the system bus and wherein said rejecting means rejects a write to one of said queues when said plurality of storing means in said queue contain addresses of locations in said main memory of sets of data corresponding to uncompleted requests from executing means.

23. The apparatus according to claim 22, wherein each of said plurality of queues is associated with one of said plurality of I/O buses.

24. The apparatus according to claim 23, wherein said I/O interface completes one I/O device access on each of said plurality of I/O buses simultaneously and includes a plurality of said set of registers for each of said plurality of I/O buses.

25. The apparatus according to claim 22, wherein each of said plurality of queues is associated with one of said plurality of said executing means.

26. The apparatus according to claim 25, wherein said I/O interface completes one I/O device access on each of said plurality of I/O buses simultaneously and includes a plurality of said set of registers for each of said plurality of I/O buses.

27. A method, for operating a computer system, comprises the steps of:

storing in a main memory, a set of data corresponding to a request by a CPU for an I/O device access from an I/O interface, said main memory being coupled to said CPU and said I/O device by a system bus; and subsequent to said request, writing, using a software visible instruction which causes a status signal indicator to provide a status signal to which a succeeding instruction is responsive, address data to a storage device on said I/O interface, said address corresponding to an address in said memory wherein said set of data is stored, and said status signal indicating whether said address data was accepted by said storage device, said software visible instruction performing different sequences of operations in response to said status signal thereby permitting checking of the status of the write to the storage device.

28. The method according to claim 27, further comprising the steps of:

retrieving said set of data from said memory;

storing said set of data in a set of registers on said I/O interface; and executing said I/O device access corresponding to said set of data.

29. The method according to claim 28, further comprising the step of updating a status portion of said set of data in said memory following said execution of said I/O device access.

30. The method according to claim 29, wherein said step of storing a set of data in said memory includes updating a cache memory.

* * * * *